SPACE SAVER DIAL

Filed May 9, 1960 2 Sheets-Sheet 1

INVENTORS J. G. BABB
H. J. HERSHEY
BY John C. Morris
ATTORNEY

Sept. 24, 1963 J. G. BABB ETAL 3,105,122

SPACE SAVER DIAL

Filed May 9, 1960 2 Sheets-Sheet 2

INVENTORS J. G. BABB
H. J. HERSHEY

BY John C. Morris

ATTORNEY 3,105,122

SPACE SAVER DIAL

James G. Babb, and Harold J. Hershey, Indianapolis, Ind.; said Hershey assignor to Bell Telephone Laboratories, Incorporated, New York, N.Y., a corporation of New York, and said Babb assignor to Western Electric Company, Incorporated, New York, N.Y., a corporation of New York Filed May 9, 1960, Ser. No. 27,890
9 Claims. (Cl. 179—90)

This invention relates to telephone call transmitters and particularly to telephone call transmitters of the dial type.

In the past, telephone instruments have generally taken the form of a handset that houses a transmitter and a receiver, and a stand that houses ringer equipment, line terminals, and a dial. The size of the stand has not been limited to any great extent and, therefore, the size of the dial has not been of much concern.

More recently, interest has been shown in incorporating the dial into the handset. The advantage of such an arrangement lies in the fact that the handset is considerably more portable than the stand and, thus, with the dial therein, the user of the telephone is not confined to the immediate vicinity of the stand. Instead, he can operate the dial anywhere that the handset cord will allow and in any bodily position that he wishes to assume. However, because the size of the handset is limited to what can be easily and comfortably held in the hand, in order to include the dial in the handset, it is vital that the dial be made as small as possible.

An object of this invention is to provide a small compact dial that is readily adaptable for use in a handset.

This and other objectives of the present invention are realized in an illustrative embodiment thereof wherein the dial includes a finger wheel in which the finger holes are spaced around the entire periphery of the wheel, the space between adjacent holes being approximately equal. The wheel is mounted on a dielectric hub and is rotatable thereon relative to a number plate mounted on a dielectric frame. The number plate is the same size as the wheel, and when the wheel is in a rest position, each finger hole overlies an individual indicia grouping on the plate. A finger stop and a wheel stop are mounted on and frictionally coupled to the hub and movable therewith through a predetermined distance, the motion of the stops being limited by stop portions of the frame. The finger stop serves to arrest the dial user's finger on windup of the wheel and the wheel stop serves to arrest the motion of the hub and thereby the wheel on rundown of the wheel.

A particular feature of this invention resides in the exposed portions of the dial being electrically insulated so as to prevent the user of the dial from being shocked due to the discharge of static electricity from his body to the dial.

A complete understanding of the invention and of this and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

Figure 1:
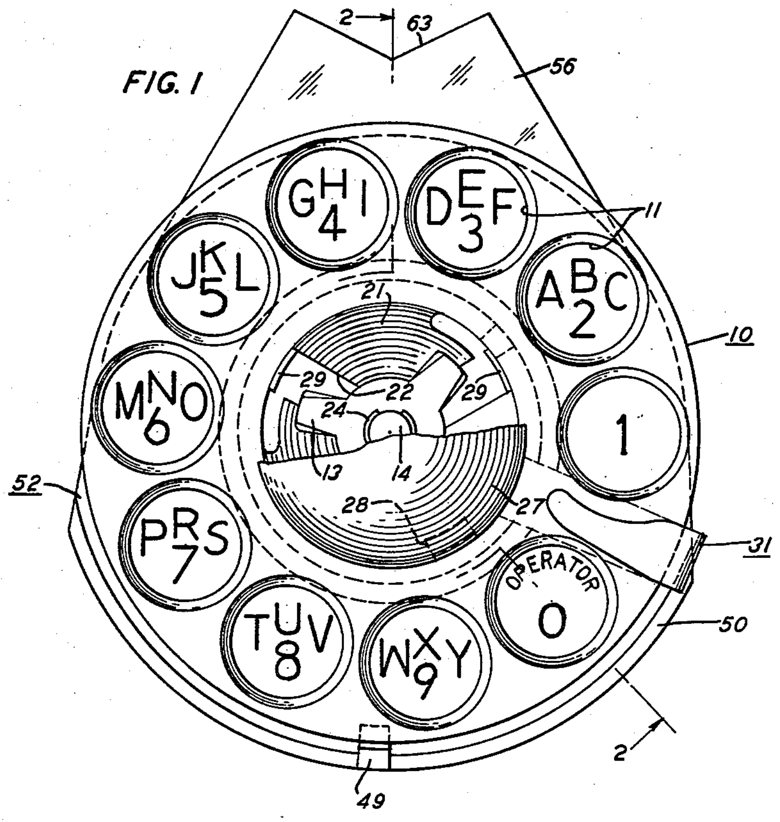
FIG. 1 is a top view, partly in section, of the dial of this invention.
Figure 2:
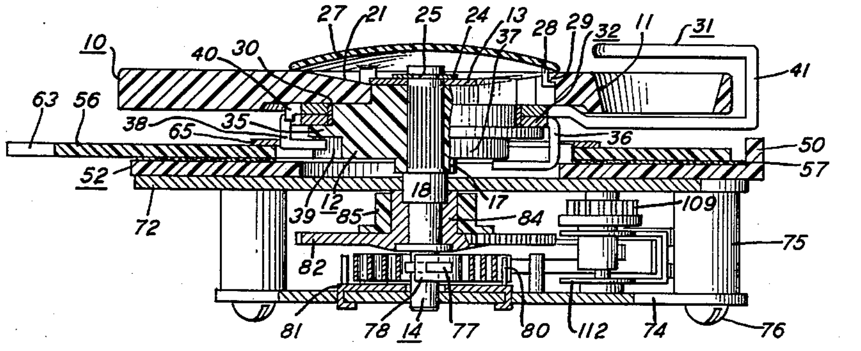
FIG. 2 is a cross-sectional view of the dial taken along line 2—2 of FIG. 1.
Figure 3:
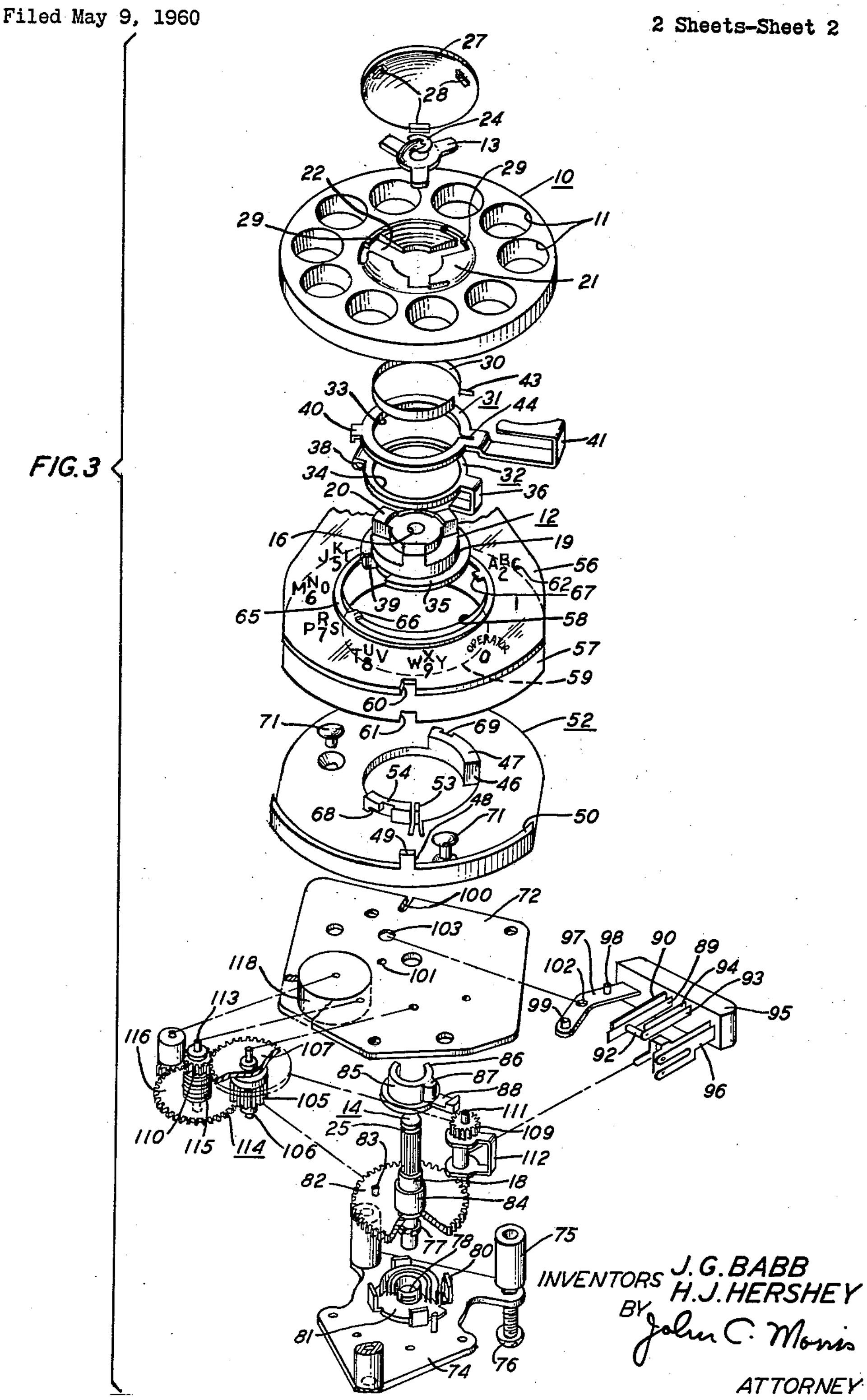
FIG. 3 is an exploded perspective view, partly in section.

Referring now to FIGS. 1, 2, and 3, the dial comprises a dielectric finger wheel 10 having ten finger holes 11 spaced around the periphery thereof. The finger holes are distributed so that spaces between all but two of the holes are equal, and the space between these two holes, referred to as the first and last holes, is only slightly greater than the individual spaces between the other holes. Thus the large space that exists between the first and last holes of most finger wheels presently in use is virtually eliminated, and the size of the wheel is thereby reduced. In one specific embodiment the angular pitch between all but the first and last holes is 34 degrees, 50 minutes, leaving a pitch of 47 degrees, 30 minutes between these two holes. Using finger holes of ½ inch diameter, which is the most commonly used hole size, and placing the centers of the holes on a radius of .900 inch so as to provide ribs of adequate strength between the holes, a finger wheel of 2.375 inches in diameter is achieved. By way of comparison, the finger wheel most commonly used in the telephone industry has a diameter of 2.937 inches. The present finger wheel is advantageously formed from a transparent dielectric material such as the acrylic polymer sold under the trademark "Lucite."

The finger wheel 10 is secured to a dielectric hub 12 by means of a spoked clamp spring 13, both the hub and the clamp spring being mounted on a main shaft 14. The portion of the main shaft that receives the hub is knurled and is slightly larger in diameter than a central opening 16 in the hub. The shaft is forced through the central opening until a boss portion 17 on the lower end of the hub bears against an enlarged diameter portion 18 of the shaft. The knurling affixes the hub to the shaft, and the enlarged diameter portion properly locates the hub on the shaft. The hub includes a cylindrical portion 19 and a spoked portion 20 at the upper end thereof (FIG. 3) that receive the finger wheel 10. Web portions 21 of the wheel rest on the cylindrical portion, while the spoked portion projects into an accommodating aperture 22 in the wheel and accurately keys the wheel to the hub.

The top surfaces of the web portions 21 of the finger wheel 10 are approximately flush with the top surface of the spoker portion 20 of the hub 12, and the upper end of the shaft 14 extends a short distance therebeyond. The clamp spring 13 is journaled on the shaft contiguous with these surfaces and is retained in place by an E-ring 24 that mounts in an annular groove 25 in the shaft. The spring has substantially the same shape as the spoked portion of the hub and can be positioned entirely thereon. When the spring is so positioned, the finger wheel may be removed from or placed on the hub. To secure the finger wheel to the hub, the spring is rotated so that its spokes lie on the web portions of the wheel. The hub is advantageously made of a dielectric material that retains its stability under a force fit and is stiff in small sections. An example of such a material is the polyacetal sold under the trademark "Delrin." The clamp spring is made from a material that is resilient such as spring steel, while the shaft is made from a material that has strength and good machinability such as steel.

The web portions 21 of the finger wheel 10, the spoke portion 20 of the hub 12, the clamp spring 13, the E-ring 24, and the upper end of the shaft 14 are all enclosed by a dome-shaped dielectric cover 27. The bottom surface of the cover, which is shown in FIG. 3, has three L-shaped legs 28 spaced around the periphery thereof. The cover is initially positioned on the finger wheel so that the legs pass through laterally extending projections of the aperture 22. It is then rotated in a clockwise direction so as to bring the foot of each leg underneath a lip 29 on the finger wheel, the lips holding the cover in place. The cover is advantageously formed from a dielectric material that has fairly good resiliency and very good stability such as the polyacetal sold under the trademark "Delrin."

Prior to the assembly of the finger wheel 10 onto the hub 12, a band 30, a finger stop 31, and a wheel stop 32 are positioned around the cylindrical portion 19 of the hub. The finger stop 31 and wheel stop 32, respectively have central openings 33 and 34 that are equal in diameter which diameter is slightly larger than the diameter of the cylindrical portion 19. The wheel stop 32 rests on a rim 35 of the hub 12 (FIG. 2) and has a retaining arm 36 that extends beneath a lower cylindrical portion 37 of the hub, and a detent arm 38 that extends beneath the rim, the arms being disposed 180 degrees apart. The retaining arm 36 holds the wheel stop 32 on the hub 12 but permits relative motion therebetween, while the detent arm 38 extends into the path traversed by a tooth 39 that depends from the rim 35. The finger stop 31 lies on the wheel stop 32 and has a limiting arm 40 that extends into the path of the detent arm 38 of the wheel stop but not into the path of the tooth 39 on the rim 35. The finger stop 31 in addition, has a stop arm 41 that extends radially and then doubles back over the finger wheel. The arms 40 and 41 of the finger stop 31 are less than 180 degrees apart at their closest point so that, with the stop arm 41 of the finger stop overlying the retaining arm 36 of the wheel stop 32, the limiting arm 40 of the finger stop, as viewed in FIG. 3, lies to the left of the detent arm 38 of the wheel stop.

The band 30 is positioned around the cylindrical portion 19 of the hub 12 and within the central openings 33 and 34 in the finger and wheel stops 31 and 32, a tab portion 43 of the band extending into a slot 44 in the finger stop. The band engages both the outside surface of the cylindrical portion 19 and the inside edges around the central openings 33 and 34 and frictionally couples the finger and wheel stops to the hub. The band is made of a resilient material such as spring steel, while the finger and wheel stops are made of a material that has strength and is easily shaped, such as steel.

When the hub 12 is rotated by the operation of the finger wheel 10, the finger stop 31 and wheel stop 32 move therewith. The motion of the finger stop is limited by the stop arm 41 thereof. When the finger stop moves in one direction, the stop arm engages a face 46 of a ridge 47, and when the finger stop moves in the other direction, the stop arm engages a face 48 of a tooth 49 extending above a ridge 50, the ridges being part of a dielectric frame 52. In addition, immediately before the stop arm engages the face 48, it strikes a finger portion 53 of the frame. The finger flexes against a ridge 54 and cushions the impact of the stop arm against the face 48, reducing the noise caused thereby. Similarly, the motion of the wheel stop 32 is limited by the retaining arm 36 thereof. The retaining arm engages the face 46 of the ridge 47 when the stop is moved in one direction and engages the finger portion 53 of the frame 52 when the wheel stop is moved in the other direction.

The distance between the face 46 and the face 48 is selected so that the finger stop 31 moves through a preassigned angular distance. In the specific embodiment previously referred to, the stop moves through an angular distance of 50 degrees, 18 minutes. The retaining arm 36 of the wheel stop 32, however, is not as wide as the stop arm 41 of the finger stop 31 and therefore the wheel stop is able to move through a greater angular distance than the finger stop. This additional distance provides the finger wheel 10 with over-travel. Over-travel is necessary when the digit zero is dialed and the finger wheel is rotated very rapidly by an implement having a small diameter. The implement does not fill the finger hole 11 and therefore rather than the wheel being arrested by the engagement of the implement with the finger stop 31, the inertia of the wheel is able to carry the zero hole beneath the finger stop. If over-travel of the wheel were not provided, the wheel 10 would be arrested by the engagement of the tooth 39 depending from the rim 35 of the hub 12 with the detent arm 38 of the wheel stop 32. This is undesirable because the momentum of the moving parts must then be absorbed by the hub 12, the shaft 14, and the working parts rigidly joined thereto, and damage to the dial may result. If, on the other hand, over-travel is provided, the wheel 10 is arrested by the engagement of the back end of the finger hole with the implement, the implement having been stopped by the finger stop 31. The momentum of the moving parts is then absorbed by the finger stop 31, the implement, and the finger wheel 10, and they are able to dissipate this energy without damage to the dial. However, should the digit zero be dialed by means of an implement so small in size that the motion of the finger wheel 10 is in fact arrested by the tooth 39 of the hub 12 striking the detent arm 38 of the wheel stop 32, added protection of the dial is provided by the finger portion 53 of the frame 52 cushioning the impact.

A number plate 56 and a card 57 lie on the frame 52, the card and plate being located thereon by means of the ridges 47 and 54 and the tooth 49 of the ridge 50. Central openings 58 and 59 in the card and plate respectively encompass the ridges 47 and 54, while notches 60 and 61 in the pair respectively accommodate the tooth 49. The plate is made from a transparent light transmitting material such as the acrylic polymer sold under the trademark "Lucite," and it has light colored indicia groupings 62 etched on the under surface thereof. The card, which may be nothing more than heavy paper, is dark in color and provides a background against which the indicia groupings are readily visible. As shown most clearly in FIG. 1, the plate extends beyond the circumference of the dial face and has a V-shaped notch 63. A light source (not shown) is positioned in the notch, and when the source is energized, the light emitted is transmitted by the plate throughout its mass providing sufficient illumination of the dial face to permit the operation of the dial in a completely dark room.

A retaining ring 65 holds the number plate 56 and card 57 in place. The ring has inwardly projecting tab portions 66 and 67 that are respectively received by L-shaped slots 68 and 69 in the ridges 47 and 54 of the frame 52. The ring is initially placed on the number plate with the tabs extending into the vertical legs of the slots and then the ring is rotated so as to place the tabs in the horizontal legs of the slots. The slots are designed so that as the ring is rotated to the latter position, it is cammed against the number plate, locking the plate and the card on the frame.

Underlying the frame 52 and fastened thereto by any well known means such as rivets 71 is an upper plate 72. The upper plate is secured to and spaced from a lower plate 74 by means of sleeves 75 through which fasteners such as indicated at 76 extend. The main shaft 14 is journaled in the plates, the lower end of the shaft having a notched rim portion 77 that receives a slotted end of a motor spring 78. The spring hooks onto the notched rim and spirals thereabout, the other end of the spring hooking onto one of four upstanding legs 80 of a spring case 81 secured to the bottom plate.

A main gear 82 is mounted on the shaft 14 above the motor spring 78. The main gear includes a pin 83 and an elongated hub portion 84. A dielectric contact spring operator 85, which rests on the top surface of the gear has a split hub portion 86 that clamps about the gear hub, frictionally coupling the operator to the gear. The operator also has a protuberance 87 and a radially extending arm 88. The arm engages the free end of a movable contact spring 89 that extends beyond and is biased toward a fixed contact spring 90. A dielectric spacer 92 bears against the movable spring and is joined to the free end of a movable contact spring 93 that extends beyond and is biased toward a fixed contact spring 94. The engaging faces of the contact springs have contacts (not shown) affixed thereto, while the other ends of the contact springs, which are spaced, have lead wires (not shown) secured thereto. The latter ends of the springs are advantageously mounted in a dielectric block 95 that is molded thereabout, the block also having pulsing contact springs 96 and a bracket 97 mounted therein. The bracket has upwardly extending pins 98 and 99 that are respectively received by a slot 100 and a hole 101 in the upper plate 72 and serve to properly locate the contact springs on the plate. The bracket is secured to the upper plate by a fastener (not shown) extending through apertures 102 and 103 therein.

The main gear 82 meshes with an intermediate pinion 105 mounted on a shaft 106 which also has an intermediate gear 107 mounted thereon. The intermediate gear meshes with both a pulsing pinion 109 and a clutch pinion 110. The pulsing pinion 109 is mounted on a shaft 111 that has thereon a pulsing cam and follower assembly 112 substantially the same as that disclosed in the copending patent application Serial No. 832,072, filed by H. J. Hershey on August 6, 1959 and issued on December 6, 1960 as Patent No. 2,963,554. The assembly operates the pulsing contact springs 96 in the manner therein described, and therefore no further reference need be made to either the assembly or the springs.

The clutch pinion 110 is journaled on a shaft 113 which has a clutch assembly 114 mounted thereon. The assembly comprises a clutch band 115 that directly couples the clutch pinion to a clutch gear 116 when the pinion rotates in a counterclockwise direction, but permits the pinion to rotate relative to the gear when the pinion moves in a clockwise direction. The clutch gear meshes with a governor pinion (not shown) to drive a governor assembly 118 of the type disclosed in Patent 2,685,946 issued to W. Pferd and R. E. Prescott on August 10, 1954.

In the operation of the dial, the user inserts his finger into the finger hole 11 corresponding to the particular digit that he wishes to transmit and moves the finger wheel 10 in a clockwise direction. The wheel rotates the hub 12, and the finger stop 31 and wheel stop 32, which are frictionally coupled to the hub by the band 30, move with the hub until the stop arm 41 of the finger stop strikes the face 48 of the tooth 49 extending above the ridge 50. Immediately before the stop arm strikes the face 48, it engages the finger portion 53 of the frame which flexes against the ridge 54 and cushions the impact of the stop arm against the face 48, reducing the noise caused thereby. The user of the dial continues to rotate the wheel until his finger engages the finger stop.

In addition, the rotation of the hub 12 and thereby the main shaft 14 mounted therein winds up the motor spring 78 and rotates the main gear 82. The split hub portion 86 of the contact spring operator 85 frictionally couples the operator to the elongated hub portion 84 of the main gear, and thus with the rotation of the gear, the operator moves therewith. The initial movement of the operator rotates its arm 88 from the movable contact spring 89 and permits the spring to engage the fixed contact spring 90 and close the contact thereon. The motion of the movable spring 89 withdraws it from the spacer 92 and thus permits the movable contact spring 93 to engage the fixed contact spring 94 and close the contacts thereon. The operator continues to rotate with the main gear until it is arrested by the engagement of the protruding portion 87 thereof and with the bracket 97.

The rotation of the main gear 82, acting through the intermediate pinion 105 and intermediate gear 107, also drives the clutch pinion 110. The clutch band 115 of the clutch assembly 114 permits the pinion to rotate on the shaft 113 relative to the clutch gear 116 and thus prevents the governor assembly 118, which is driven by the clutch gear, from limiting the speed at which the finger wheel is wound up.

When the user of the dial removes his finger from the finger hole 11 and the finger wheel 10, the motor spring 78 commences to rotate the main shaft 14 and thereby the main gear 82 in a counterclockwise direction. The main gear, operating through the intermediate pinion 105 and intermediate gear 107, drives the clutch pinion 110 in a counterclockwise direction, and therefore the clutch band 115 directly couples the pinion to the clutch gear 116. The clutch gear drives the governor assembly 118, which limits the rundown speed of the entire train of gears.

The contact spring operator 85 rotates with the main gear 82 until it engages the movable contact spring 89. The friction between the operator and the main gear is less than the combined spring force of the spring 89 and the movable spring 93, and the operator is therefore arrested. However, immediately before the rundown of the dial is completed, the pin 83 on the main gear engages the operator and positively moves it, causing the movable springs 89 and 83 to respectively move from the fixed contact springs 90 and 94, opening the contacts thereon.

The hub 12 and the finger wheel 10, of course, rotate with the main shaft, and the finger stop 31 and wheel stop 32 move with the hub until the stop arm 41 of the finger stop strikes the face 46 of the ridge 47 of the frame 52. The rotation of the hub then continues relative thereto until the tooth 39 depending from the rim portion 35 thereof engages the detent arm 38 of the wheel stop, and the wheel is arrested thereby. If any relative motion has taken place between the wheel stop and finger stop, the tooth 39 will move the wheel stop until the retaining arm 36 thereof engages the face 46 of the ridge 47, at the same time bringing the detent arm of the ring stop into engagement with the limiting arm 40 of the finger stop. The motion of the finger stop is then registered in one direction by the ridge 47 of the frame and in the other direction by the detent arm of the ring stop.

It is to be noted that the dial has been designed so that all the exposed parts are made of a dielectric material and/or are insulated from all other metal parts of the dial. This virtually eliminates the possibility of the user of the dial receiving a shock due to the discharge of static electricity from his body to the dial. This feature is quite significant when the dial is incorporated in a handset as the dial is then brought into juxtaposition with the face, and receiving a shock on the face is very repugnant to most people.

Although but one embodiment of the invention has been illustrated and described in detail, it is expressly understood that the invention is not limited thereto. Various changes can be made in the design and arrangement of the parts without departing from the spirit and the scope of the accompanying claims.

What is claimed is:

1. A telephone dial comprising stationary means having shaft means journaled therein, a finger wheel for rotating the shaft means, the wheel having a plurality of finger holes by means of which it may be rotated from a rest position through arcs of various lengths by the insertion therein of a finger of the dial user and the moving of the finger in an arcuate path, a movable finger stop projecting into the arcuate path traversed by the finger of the dial user for stopping the finger from rotating the wheel beyond the stop, means for limiting the motion of the stop between a first and a second position, the limiting means comprising a flexible element and a rigid element, the flexible element being deflected by the engagement of the finger stop thereagainst.

2. A telephone dial comprising axially rotatable means, a finger wheel secured to the axially rotatable means, the finger wheel having a plurality of finger holes by means of which it may be rotated through various angular distances, a finger stop for limiting the rotation of the finger wheel in one direction when it is rotated by a finger, the finger stop being movable through a first angular distance, and a wheel stop for limiting the rotation of the finger wheel independent of the finger stop, the wheel stop being movable through a second angular distance, the second angular distance being greater than the first angular distance.

3. A telephone dial comprising an axially rotatable means having a protrusion thereon, a finger wheel secured to the axially rotatable means, the finger wheel having a plurality of finger holes by means of which it may be rotated through various angular distances, a finger stop frictionally coupled to the axially rotatable means and movable therewith, means for limiting the rotation of the finger stop through a first angular distance, a wheel stop frictionally coupled to the axially rotatable means and movable therewith, the wheel stop extending into the path traversed by the protrusion on the axially rotatable means, and means for limiting the rotation of the wheel stop through a second angular distance, which distance is greater than the first angular distance.

4. A telephone dial comprising axially rotatable means having a protrusion thereon, a finger wheel secured to the axially rotatable means, the finger wheel having a plurality of finger holes by means of which it may be rotated through various angular distances, a finger stop frictionally coupled to the axially rotatable means and movable therewith, a wheel stop frictionally coupled to the axially rotatable means and movable therewith, the wheel stop extending into the path traversed by the protrusion on the axially rotatable means, first stationary means extending into the path of both the finger stop and the wheel stop for limiting the motion thereof in a clockwise direction and second stationary means extending into the path of both the finger stop and the wheel stop for limiting the motion thereof in a counterclockwise direction, the portion of the finger stop engaging the first and the second limiting means being of greater width than the portion of the wheel stop engaging the first and the second limiting means, whereby the wheel stop is movable through a greater angular distance than the finger stop.

5. A telephone dial comprising stationary means having first and second spaced protrusions, shaft means journaled in the stationary means, a hub disposed about and secured to the shaft means, the hub having a tooth, a finger wheel secured to the hub, the finger wheel having a plurality of finger holes by means of which it may be rotated through various angular distances, a finger stop and a wheel stop frictionally coupled to the hub and movable therewith between the first and second protrusions on the frame, the first and second protrusions extending into the path traversed by the finger stop and the wheel stop and being engageable by portions thereof, the portion of the finger stop engaging the first and the second protrusions being of greater width than the portion of the wheel stop engaging the first and the second protrusions, a portion of the wheel stop extending into the path traversed by the tooth on the hub, the rotation of the finger wheel being limited by the engagement therebetween.

6. A telephone dial as in claim 5 wherein the hub and the spaced protrusions of the stationary means are dielectric members, the hub and spaced protrusions electrically isolating the finger stop.

7. A telephone dial as in claim 5 wherein one of the protrusions of the stationary means includes means for absorbing the impact of the finger stop thereagainst.

8. A telephone dial as in claim 5 wherein the wheel stop has a first arm extending between the first and second protrusions and a second arm extending into the path traversed by the tooth of the hub, and the finger stop has a first arm extending between the first and the second protrusions and a second arm extending into the path traversed by the second arm of the wheel stop but clear of the path traversed by the tooth of the hub.

9. A telephone dial comprising stationary means, shaft means journaled in the stationary means, a dielectric hub disposed about and secured to the shaft means, the hub having a tooth, a finger wheel secured to the hub, the finger wheel having a plurality of finger holes spaced around the entire periphery thereof, the distance adjacent finger holes being approximately equal, a wheel stop and a finger stop frictionally coupled to the hub and movable therewith, the wheel stop having a first arm extending into the path traversed by the tooth of the hub and a second arm extending in the opposite direction from the first arm, and the finger stop having a first arm extending into the path traversed by the first arm of the wheel stop but clear of the path traversed by the tooth of the hub and a second arm extending in the opposite direction from the first arm, and a dielectric frame secured to the stationary means and having spaced protrusions extending into the path traversed by the second arms of the wheel stop and the finger stop to limit the movement thereof, one of the protrusions including means for absorbing the impact of the second arms of the wheel stop and the finger stop thereagainst, the second arm of the finger stop being of greater width than the second arm of the wheel stop and the wheel stop thereby being movable through a greater angular distance than the finger stop.

References Cited in the file of this patent

UNITED STATES PATENTS

| | | |
|---|---|---|
| 1,095,539 | Anderson | May 5, 1914 |
| 1,286,982 | Forsberg | Dec. 10, 1918 |
| 1,556,905 | Blessing | Oct. 13, 1925 |
| 2,307,226 | Lum | Jan. 5, 1943 |
| 2,767,251 | Alexandersson | Oct. 16, 1956 |
| 2,905,766 | Soderbaum | Sept. 22, 1959 |
| 2,963,554 | Hershey | Dec. 6, 1960 |